United States Patent [19]
Sekimura et al.

[11] Patent Number: 5,461,494
[45] Date of Patent: Oct. 24, 1995

[54] FERROELECTRIC LIQUID CRYSTAL DEVICE HAVING COLORED FILM AND PROTECTIVE FILM AT NON-PIXEL PORTIONS

[75] Inventors: Nobuyuki Sekimura, Kawasaki; Akio Yoshida, Fujisawa; Masaki Kuribayashi, Higashikurume, all of Japan

[73] Assignee: Canon Kabushiki Kaisha, Tokyo, Japan

[21] Appl. No.: 236,160

[22] Filed: May 2, 1994

Related U.S. Application Data

[63] Continuation of Ser. No. 866,111, Apr. 7, 1992, abandoned, which is a continuation of Ser. No. 513,039, Apr. 23, 1990, abandoned, which is a continuation of Ser. No. 38,720, Apr. 15, 1987, abandoned.

[30] Foreign Application Priority Data

Apr. 17, 1986 [JP] Japan .................................. 2-088605

[51] Int. Cl.$^6$ .......................... G02F 1/1333; G02F 1/141
[52] U.S. Cl. ............... 359/67; 359/76; 359/79; 359/100; 359/78; 359/56
[58] Field of Search ............. 350/350 S, 339 F, 350/339 R, 340, 341, 336; 340/784, 765; 359/56, 54, 74, 75, 76, 78, 79, 67, 100

[56] References Cited

U.S. PATENT DOCUMENTS

| | | | |
|---|---|---|---|
| 4,286,266 | 8/1981 | DeZwart et al. | 340/765 |
| 4,367,924 | 1/1983 | Clark et al. | 350/350 S |
| 4,548,476 | 10/1985 | Kaneko | 350/350 S |
| 4,561,726 | 12/1985 | Goodby et al. | 350/341 |
| 4,569,574 | 2/1986 | Masaki et al. | 350/339 R |
| 4,591,240 | 5/1986 | Masaki et al. | 350/339 F |
| 4,597,637 | 7/1986 | Ohta | 350/339 F |
| 4,600,274 | 7/1986 | Morozumi | 350/339 F |
| 4,601,546 | 7/1986 | Ohta | 350/339 F |
| 4,638,089 | 1/1987 | Okada et al. | 350/350 S |
| 4,673,253 | 6/1987 | Tanabe et al. | 350/339 F |
| 4,681,404 | 7/1987 | Okada et al. | 350/336 |
| 4,712,874 | 12/1987 | Sekimura et al. | 350/336 |
| 4,733,948 | 3/1988 | Kitahara | 350/334 |
| 4,738,515 | 4/1988 | Okada et al. | 359/68 |
| 4,824,213 | 4/1989 | Morokawa | 350/336 |
| 4,846,540 | 7/1989 | Tsuboyama et al. | 350/350 S |
| 5,192,596 | 3/1993 | Hanyu et al. | 359/75 |
| 5,227,899 | 7/1993 | Nobuyuki | 359/79 |

FOREIGN PATENT DOCUMENTS

| | | | |
|---|---|---|---|
| 0075321 | 4/1986 | Japan | 350/339 F |
| 0112129 | 5/1986 | Japan | 350/339 F |

OTHER PUBLICATIONS

W. J. A. M. Hartmann "Ferroelectric Liquid–Crystal Video Display" Proceeding of the SID—vol. 30—No. 2—1989—pp. 99–103.

T. Uchida—"A full–color Matrix . . . Color layers on Electrodes" pp. 503–507—IEEE Transactions on Electrons Devices—vol. 30 No. 5—1983.

*Primary Examiner*—William L. Sikes
*Assistant Examiner*—Tai V. Duong
*Attorney, Agent, or Firm*—Fitzpatrick, Cella, Harper & Scinto

[57] ABSTRACT

A ferroelectric liquid crystal device, comprises: a plurality of pixel portions having a pair of opposite electrodes, and a plurality of non-pixel portions where a pair of opposite electrodes are not disposed, respectively arranged two-dimensionally; and a ferroelectric liquid crystal disposed between the opposite electrodes and extending over the pixel portions and the non-pixel portions. The non-pixel portions further comprise a colored film having a light-interruption function and a protective film disposed between and preventing direct contact between the colored film and the ferroelectric liquid crystal.

15 Claims, 3 Drawing Sheets

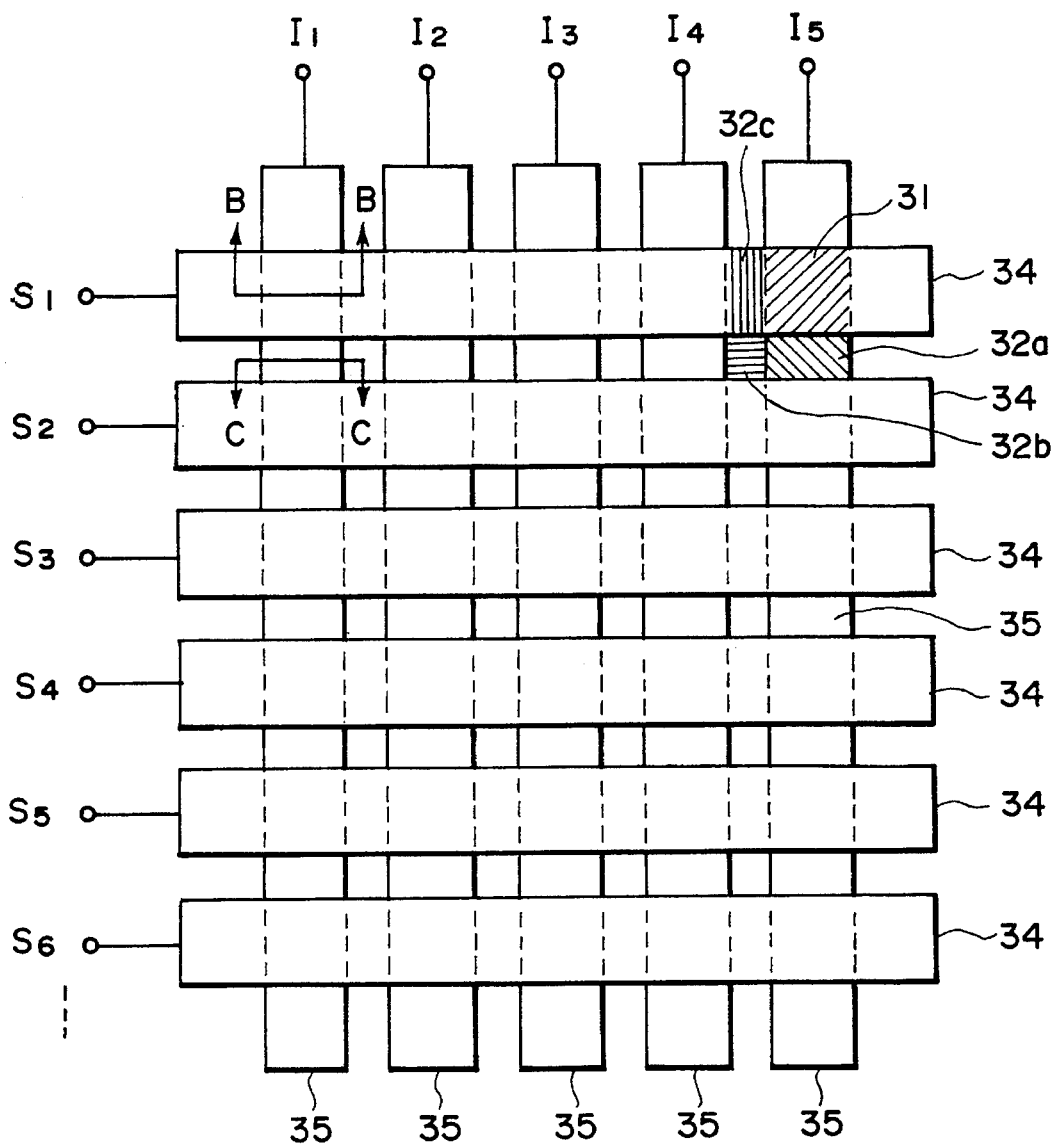
F I G. 3A
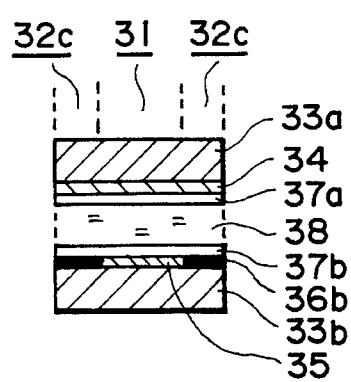
F I G. 3B
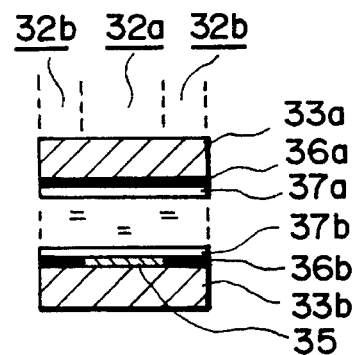
F I G. 3C

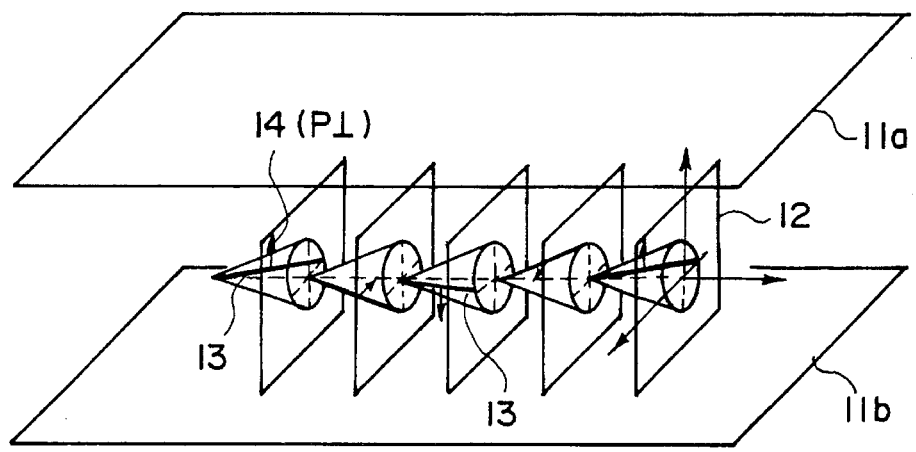
F I G. 4
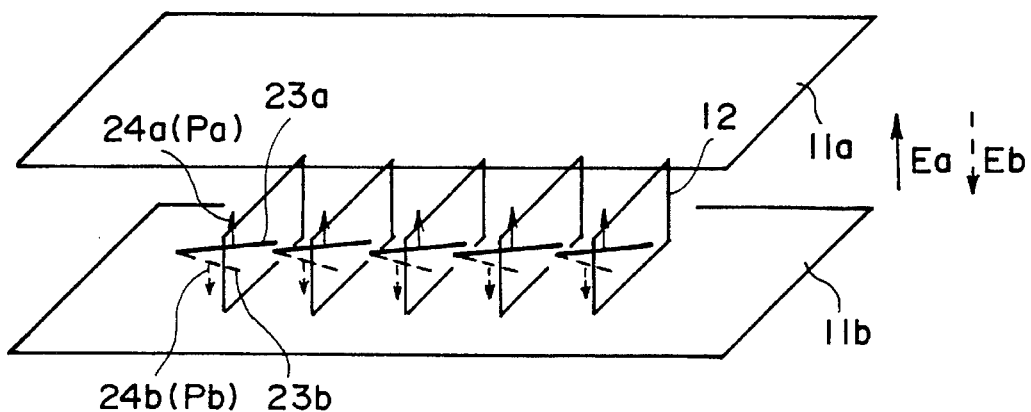
F I G. 5
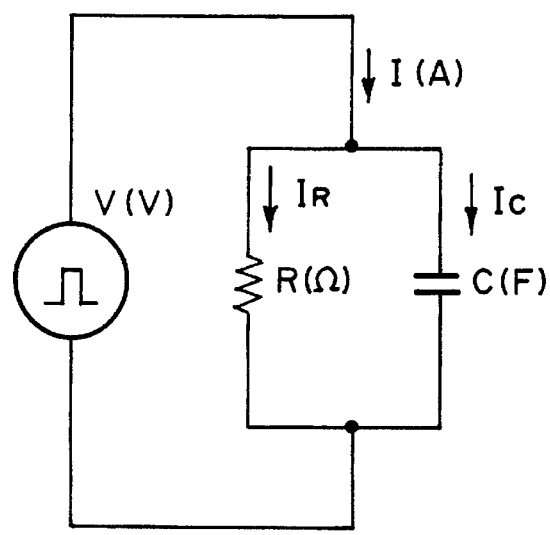
F I G. 6

FERROELECTRIC LIQUID CRYSTAL DEVICE HAVING COLORED FILM AND PROTECTIVE FILM AT NON-PIXEL PORTIONS

This application is a continuation of application Ser. No. 866,111, filed Apr. 7, 1992, now abandoned, which is a continuation of application Ser. No. 513,039, filed Apr. 23, 1990, now abandoned, which is a continuation of application Ser. No. 038,720, filed Apr. 15, 1987, now abandoned.

FIELD OF THE INVENTION AND RELATED ART

The present invention relates to a ferroelectric liquid crystal device for a display panel, particularly a ferroelectric liquid crystal device using a chiral smectic liquid crystal showing at Least two stable states under no electric field.

Clark and Lagerwall has clarified that a liquid crystal device showing bistability can be obtained by using a liquid crystal layer of chiral smectic C phase or H phase in a thickness which is designed to be small enough to release the helical structure in U.S. Pat. No. 4,367,924, etc. It is disclosed that the liquid crystal device shows a high response speed and also a memory characteristic.

In the ferroelectric liquid crystal device of Clark and Lagerwall described above, liquid crystal molecules in the initially aligned stage from a domain in which liquid crystal molecules oriented to a first stable state and liquid crystal molecules oriented to a second stable state are present in mixture. More specifically, in a chiral smectic liquid crystal under bistability condition, an alignment control force for orienting the liquid crystal molecules to the first stable state and an alignment control force for orienting the liquid crystal molecules to the second stable state have nearly equal energy levels, so that when the chiral smectic liquid crystal is aligned in a layer thin enough to show the bistability, the liquid crystal molecules result in a mixture domain wherein the liquid crystal molecules are oriented to the first stable state and to the second stable state in nearly equal proportions.

When such a liquid crystal device is provided with a matrix electrode structure comprising scanning lines and data lines to form a display panel wherein a pixel is formed at each intersection of the scanning electrode lines and the data electrode lines defined by a pair of opposing electrodes, there results in a problem that the chiral smectic liquid crystal at a non-pixel portion where a pair of opposite electrodes are not present retains its initial mixture orientation state at the initial alignment stage so that a sufficient degree of light-interruption is not attained when combined with cross-nicol polarizers. More specifically, as a pair of opposite electrodes are not present at the non-pixel portions, the orientation of the chiral smectic liquid crystal cannot be controlled electrically at the non-pixel portions. As a result, at the non-pixel portions, liquid crystal molecules oriented to at least two stable states providing a plurality of molecular axes are co-present in mixture, so that a maximum light-interruption cannot be realized at the non-pixel portions under cross-nicols. For this reason, in a display panel using the liquid crystal device, a sufficiently large image contrast has not been obtained.

As a result of our study on the above problem, we could solve the problem by disposing a colored film having a light-interrupting function at the non-pixel portions. In accordance with this, however, another problem has been found that the liquid crystal device cannot retain a stable switching characteristic after a long period of use.

More specifically, when a colored film is used in a ferroelectric liquid crystal device, a pigment or dye contained in the colored film is dissolved in the ferroelectric liquid crystal (hereinafter sometimes abbreviated as "FLC"), so that in a long period of use of the device, the resistivity of the FLC is gradually lowered with the elapse of time, thus consequently resulting in failure to effect normal driving because of the following reasons.

FIG. 1A shows a driving voltage waveform applied to a pixel of FLC, and FIG. 1B shows a voltage waveform actually applied to the FLC per se. More specifically, when a writing pulse of $V_{ON}$ is applied between the intersecting electrodes, the voltage effectively applied to the FLC decreases as shown in FIG. 1B from $V_0$ at the time of the pulse application by $\Delta V_0$ corresponding to the time constant $\pi$=RC (R: resistance of FLC; C: capacitance of FLC). The voltage decrease $\Delta V$ becomes larger as the resistance R of the FLC is smaller, and as a result, a reverse polarity of voltage $-\Delta V_0$ is applied to the ferroelectric liquid crystal at the time of pulse switching (falling down). When the voltage in terms of an absolute value $|-\Delta V_0|$ is larger then the inversion threshold voltage $|-Vth|$, a writing into a display state of, e.g., "black" opposite to a desired "white" state. This is caused by discharge from a dielectric layer such as an alignment control film connected in series to the FLC to generate a reverse electric field of $-\Delta V_0$.

In this way, if a colored film containing a pigment or dye is applied at the non-pixel portions, the pigment or dye in the colored layer is dissolved in the FLC, so that the resistance R of the FLC in the cell is lowered with the elapse of time in the long period of use of the cell, finally leading to the application of a reverse voltage $-\Delta V_0$ exceeding the inversion threshold voltage. As a result, a desired switching operation cannot be effected.

Further, as a line-sequential writing scheme applied to an FLC device, there is a scheme wherein a pulse providing a first display state based on a first orientation state of the FLC is applied to all or a prescribed part of the pixels on a row in a first phase $t_1$, and then in a subsequent second phase $t_2$, a pulse for inverting the first display state into a second display state based on a second orientation state of the FLC is applied to selected pixels.

In the case of writing according to the above scheme, to a pixel which is to retain the first display state, a pulse voltage which is below the threshold voltage and has a polarity opposite to that of the pulse applied in the phase $t_1$, is applied in the phase $t_2$ as shown in FIG. 2A.

In this way, in the line-sequential writing scheme, the display state resultant in the phase $t_1$ is to be retained without causing inversion in the phase $t_2$. This means that a voltage exceeding the inversion threshold voltage should not be applied to a pixel which is to retain the first display state in the phase $t_2$. As a result of our study, however, at the time of pulse polarity switching from phase $t_1$ to phase $t_2$, the FLC is effectively supplied with a voltage of $-(aV_0+\Delta V_0)$ (a is a parameter satisfying the relation of $a<|Vth|/|V_{ON}|$). When the voltage $-(aV_0+\Delta V_0)$ exceeds the inversion threshold voltage, a pixel expected to retain the first display state is inverted into the second display state in phase $t_2$, whereby a desired display cannot be provided.

SUMMARY OF THE INVENTION

Accordingly, a principal object of the present invention is to provide an FLC device showing a maximum light-interruption at the non-pixel portions while retaining a stable switching characteristic for a long period of time.

According to the present invention, there is provided a ferroelectric liquid crystal device, comprising a plurality of pixel portions having a pair of opposite electrodes and a plurality of non-pixel portions where a pair of opposite electrodes are not disposed, respectively arranged two-dimensionally; and a ferroelectric liquid crystal disposed between the opposite electrodes and extending over the pixel portions and the non-pixel portions;

said non-pixel portions further comprising a colored film having a light-interruption function and a protective film disposed between and preventing direct contact between the colored film and the ferroelectric liquid crystal.

In the present invention, by using a protective film covering a colored film disposed at the non-pixel portions, the dissolution or elution of the pigment or dye in the colored film is prevented, whereby it becomes possible to prevent an increase in reverse electric field ($-\Delta V_0$) caused by a decrease in resistivity of the FLC.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 3A is a plan view of a liquid crystal device according to the present invention; FIGS. 3B and 3C are sectional views taken along the line B—B and the line C—C, respectively, in FIG. 3A;

FIGS. 4 and 5 are respectively a schematic view showing an FLC device used in the present invention; and FIG. 6 is a circuit diagram of a circuit for resistance measurement used in an embodiment of the present invention.

DETAILED DESCRIPTION OF PREFERRED EMBODIMENTS

Figure 2A:
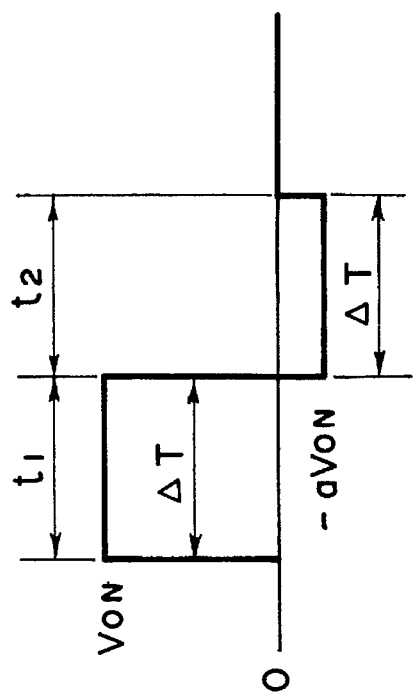
FIGS. 1A and 2A respectively show a pulse voltage waveform applied to a pixel, and FIGS. 1B and 2B respectively show a pulse voltage waveform effectively applied to an FLC.
Figure 2B:
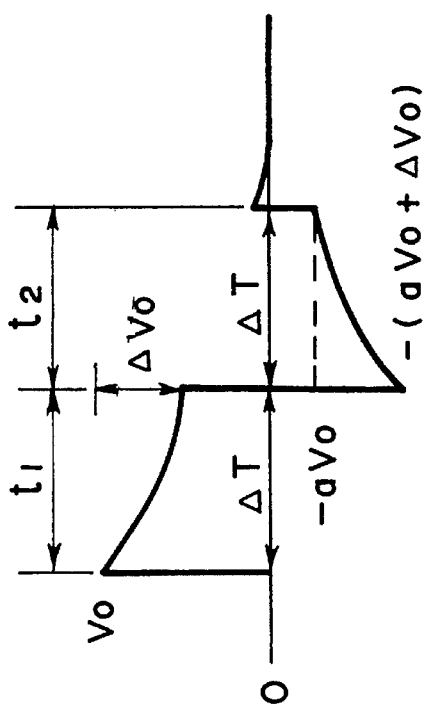
Figure 1A:
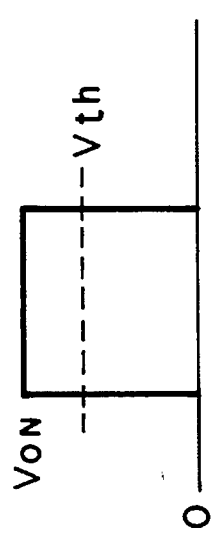
Figure 1B:
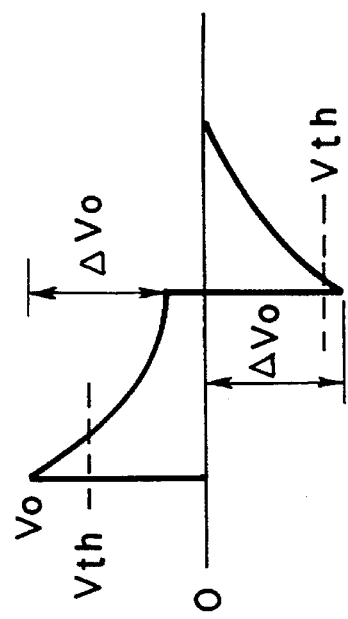

FIG. 3A is a plan view of an FLC device according to the present invention, and FIGS. 3B and 3C are sectional views taken along the lines B—B and C—C, respectively, in FIG. 3A. The FLC device shown in FIGS. 3A–3B comprises scanning electrodes 34 and data electrodes 35 arranged in the form of a matrix. The respective electrodes are connected to scanning side terminals $S_1$, $S_2$, . . . and data side terminals $I_1$, $I_2$, . . . , which in turn are respectively connected to external drive circuits (not shown). The scanning electrodes 34 and data electrodes 35 are supported on substrates 33a and 33b, respectively, composed of a glass plate, a plastic film, etc. The scanning electrodes 34 and data electrodes 35 may be in the form of transparent stripes which are, e.g., composed of ITO (indium-tin-oxide).

A pixel portion 31 in the FLC device corresponds to a portion where a scanning electrode 34 and a data electrode 35 are disposed opposite to each other. A non-pixel portion 32a corresponds to a portion where only a data electrode 35 is disposed with no opposite electrode. A non-pixel portion 32b corresponds to a portion where neither scanning electrode nor data electrode is disposed, and a non-pixel portion 32c corresponds to a portion where only a scanning electrode 34 is disposed with no opposite electrode.

These non-pixel portions 32a–32c are provided with colored films 36a and 36b. The colored films 36a are disposed in the form of stripes at respective spacings between the scanning electrodes 34. The colored films 36b are similarly disposed in the form of stripes at respective spacings between the data electrodes 35.

The colored films 36a and 36b may be formed of a film of a resin such as polyvinyl alcohol or cellulose resin colored with a pigment or dye. Examples of the pigment or dye used for this purpose may include perylene pigments, tetrazo pigments, cyanine dyes, merocycyanine dyes, azulenium dyes, anthraquinone dyes, naphthoquinone dyes, phenolic dyes, disazo dyes, trisazo dyes, and tetrazo dyes. These colorants may be used singly or in mixture. Among these, black colorants may preferably be used.

The colored films 36a and 36b may also be formed by vapor deposition of various organic pigments. Examples of the organic pigments used for this purpose may include copper phthalocyanine pigment, lead phthalocyanine pigment, perylene pigments, indigo pigments, thioindigo pigments, disazo pigments, trisazo pigments, and tetrazo pigments. These pigments may be used singly or in mixture. Among these, black pigments may preferably be used.

In another preferred embodiment of the present invention, the colored films 36 and 36b may comprise colored polyimide, colored polyamide, colored polyamideimide or colored polyesterimide. In particular, polyamides (e.g., 6-nylon, 6,6-nylon or copolymer nylon) and polyesters are soluble in various organic solvents, and therefore these polymers may be used in the form of a solution adapted to mixing therewith of various organic pigments. Further, in order to color polyimide, polyamideimide, or polyesterimide, in a solution of a polyamic acid as a precursor thereof, an organic pigment may be dispersed together with a dispersant such as an azo dye, phthalocyanine dye or triphenylmethane dye having a functional group such as hydroxyl group, carboxyl group, sulfonic acrid group, carbonamide group, sulfonamide group, etc. These colored films have a good adhesion with protective films 37a and 37b to provide good performances.

The colored films 36a and 36b used in the present invention may preferably have a thickness of 100 Å–2 μm, particularly 500 Å–1 μm and a transmittance of 5% or lower, particularly 1% or lower, with respect to visible light.

The protective films 37a and 37b used in the present invention may be formed of any material but may preferably be formed of an inorganic insulating material, such as silicon nitride, silicon nitride containing hydrogen, silicon carbide, silicon carbide containing hydrogen, silicon oxide, boron nitride, boron nitride containing hydrogen, cerium oxide, aluminum oxide, zirconium oxide, titanium oxide, magnesium fluoride, SiO and $SiO_2$; or an organic insulating material, such as polyvinyl alcohol, polyimide, polyamideimide, polyesterimide, polyparaxylylene, polyester, polycarbonate, polyvinyl acetal, polyvinyl chloride, polyvinyl acetate, polyamide, polystyrene, cellulose resin, melamine resin, urea resin, acrylic resin, and photoresist resin. The thickness of the insulating film may suitably be 5000 Å or less, preferably 100 Å–5000 Å, particularly 500 Å–3000 Å.

In order to effectively prevent the above mentioned inversion phenomenon in the present invention, it is preferred that the protective films 37a and 37b also extend over the scanning electrodes 34 and the data electrodes 35 and the protective films 37a and 37b provide a capacitance of $5.5 \times 10^3$ $pF/cm^2$ or above. The capacitance may more preferably be $5.5 \times 10^3$ $pF/cm^2$–$3.0 \times 10^5$ $pF/cm^2$, particularly preferably $9.0 \times 10^3$ pF/cm$^2$–$5.5 \times 10^4$ pF/cm$^2$ in order to retain a sufficient insulation performance.

The protective films 37a and 37b may be formed uniformly over the substrates 33a and 33b and may be subjected to a uniaxial orientation treatment such as rubbing to be provided with an alignment control effect on the FLC 38.

Referring to FIG. 4, there is schematically shown an example of a ferroelectric liquid crystal cell for explanation of the operation thereof. Reference numerals 11a and 11b denote substrates (glass plates) on which a transparent electrode of, e.g., $In_2O_3$, $SnO_2$, ITO ( Indium-Tin -Oxide), etc., is disposed, respectively. A liquid crystal of, e.g., an SmC*-phase in which liquid crystal molecular layers 12 are oriented perpendicular to surfaces of the substrates is hermetically disposed therebetween. Full lines 13 show liquid crystal molecules. Each liquid crystal molecule 13 has a dipole moment (P⊥) 14 in a direction perpendicular to the axis thereof. When a voltage higher than a certain threshold level is applied between electrodes formed on the substrates 11a and 11b, a helical structure of the liquid crystal molecule 13 is unwound or released to change the alignment direction of respective liquid crystal molecules 13 so that the dipole moments (P⊥) 14 are all directed in the direction of the electric field. The liquid crystal molecules 13 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device, of which optical characteristics vary depending upon the polarity of an applied voltage. Further, when the thickness of the liquid crystal cell is sufficiently thin (e.g., 1μ), the helical structure of the liquid crystal molecules is unwound even in the absence of an electric field whereby the dipole moment assumes either of the two states, i.e., Pa in an upper direction 23a or Pb in a lower direction 24a as shown in FIG. 5. When an electric field Ea or Eb higher than a certain threshold level and different from each other in polarity as shown in FIG. 5 is applied to a cell having the above-mentioned characteristics, the dipole moment is directed either in the upper direction 24a or in the lower direction 24b depending on the vector of the electric field Ea or Eb. In correspondence with this, the liquid crystal molecules are oriented in either of a first stable state 23a and a second stable state 23b. In order to realize such an alignment state capable of providing at least two stable states, it is preferable that the thickness of the cell is as thin as possible and generally 0.5 to 20μ, particularly 1 to 5μ. A liquid crystal-electrooptical device having a matrix electrode structure in which the ferroelectric liquid crystal of this kind is used is proposed, e.g., in the specification of U.S. Pat. No. 4,367,924 by Clark and Lagerwall.

For the FLC 38 used in the present invention, a chiral smectic liquid crystal is most preferred, and among the class of liquid crystals, those in chiral smectic C-phase (SmC*), H-phase (SmH*), I phase (SmI*), J phase (SmJ*), K phase (SINK*), G phase (StaG*) or F phase (SmF*) are suited.

More specifically, examples of the material constituting the FLC 38 may include: p-decyloxy-benzylidene-p'-amino-2-methylbutylcinnamate (DOBAMBC), p-hexyloxybenzylidene-p'-amino-2-chloropropylcinnamate (HOBACPC), p-decyloxybenzylidene-p'-amino-2-methylbutyl-α-cyanocinnamate (DOBAMBCC), p-tetradecyloxybenzylidene-p'-amino-2-methylbutyl-α-cyanocinnamate (TDOBAMBCC), p-octyloxybenzylidene-p'-amino-2-methylbutyl-α-chlorocinnamate (OOBAMBCC), p-octyloxybenzylidene-p'-amino-2-methylbutyl-α-methylcinnamate, 4,4'-azoxycinnamic acid-bis(2-methylbutyl)-ester, 4-O-(2-methyl)butylresorcylidene-4'-octylaniline (MBRA 8) , 4-(2'-methylbutyl)phenyl-4'-octyloxybiphenyl-4-carboxylate, 4-hexyloxyphenyl-4-(2"-methylbutyl)biphenyl-4'-carboxylate, 4-octyloxyphenyl-4-(2"-methylbutyl)biphenyl-4'-carboxylate, 4-heptylphenyl-4-(4"-methylhexyl)biphenyl-4'-carboxylate, and 4-(2"-methylhexyl)biphenyl-4'-carboxylate.

These FLC compounds may be used singly or in combination of two or more species thereof, or further can be used in mixture with another non-ferroelectric liquid crystal, such as a nematic liquid crystal, a cholesteric (chiral nematic) liquid crystal or a smectic liquid crystal. Further, the FLC 38 may be used in a helical structure as shown in FIG. 4 or in a non-helical structure as shown in FIG. 5. When an FLC showing a helical structure as shown in FIG. 4 is used, it is preferred that the FLC is one having a negative dielectric anisotropy and is subjected to a driving method wherein an AC bias is applied between pairs of electrodes sandwiching the FLC so as to provide a non-spiral structure showing bistability. Further, it is also possible to apply such an AC bias to a liquid crystal device which has a liquid crystal layer thin enough to release the helical structure in the absence of an electric field.

Hereinbelow, the present invention will be explained with reference to specific examples of production.

EXAMPLE 1

A square glass plate having thereon stripe electrodes of an ITO film formed in a width of 62.5 μm at a pitch of 100 μm, was provided and placed with its side having the ITO film facing downwardly in a vacuum evaporation apparatus, in which a mixture of copper phthalocyanine pigment, lead phthalocyanine and perylene red was evaporated for deposition. As a result, a 5000 Å-thick black vapor-deposited film was formed over the ITO film. Then, the vapor-deposited film was subjected to a prescribed photolithographic process to be removed selectively with respect to the portions thereof on the ITO film.

Then, a 5 wt. % solution in N-methylpyrrolidone of a polyamic acid (a dehydro-condensation product of pyromellitic dianhydride and 4,4'-diaminodiphenyl ether; a polyimide precursor) was applied thereon by means of a spinner coater so as to provide a thickness after heat-curing of 800 Å and then subjected to heat-curing to form a polyimide film.

A pair of electrode plates were prepared in the above described manner, and the polyimide film on one of them was subjected to rubbing in parallel with the extension of the stripe electrodes to provide an electrode plate A. The polyimide film on the other electrode plate was rubbed in a direction perpendicular to the extension of the stripe electrodes to provide an electrode plate B.

Then, the electrode plate B was dipped in a dispersion of 40 mg of alumina beads having an average particle size of about 5 μm in 400 cc of methanol and taken out to be dried, whereby the electrodes plate B was provided with alumina beads dispersed thereon.

A thermosetting type epoxy adhesive was applied onto the peripheral portion on the electrode plate except for a part providing an injection port by the screen printing process, and the electrode plate A and the electrode plate B were arranged and superposed to each other so that their stripe electrodes cross each other at right angles. Then, a pressure of 5 kg/cm$^2$ was uniformly applied from outside the electrode plate A and the adhesive was thermally set under the pressure to provide a blank cell.

A liquid crystal composition A shown below and showing SmC* phase at 20° C.–78° C. was heated into an isotropic phase and injected into the above blank cell through the injection port. Then, the injection port was sealed. The cell was gradually cooled and kept at a temperature of 40° C. At the temperature, the cell was provided with a pair of polarizers in a right angle cross nicol arrangement and observed through a microscope, whereby a monodomain of SmC* in a non-helical structure free of alignment defects was found to be formed. The transmittance at the non-pixel portions where opposite intersecting electrodes were not present, was measured under the right angle cross nicols, whereby an average transmittance of 0.5% was obtained with respect to the wavelength range of 400–600 mm.

obtained in the following manner according to the dural frequency method by using a circuit as shown in FIG. 6 to apply rectangular pulses and using the following equations:

$$I = I_C + I_R = 4f \cdot C_{LC} \cdot V + V/R_{LC}$$

wherein V: measured voltage, f: frequency of the rectangular pulses, $I_C$: current of capacive component; $I_R$: current of R component, $C_{LC}$: capacitor of liquid crystal, and $R_{LC}$: resistance of liquid crystal ($\Omega$).

For different frequencies, the following equations are obtained:

$$I_1 = 4f_1 \cdot C_{LC} \cdot V + V/R_{LC},$$

$$I_2 = 4f_2 \cdot C_{LC} \cdot V + V/R_{LC}.$$

Finally, the resistivity ρ is calculated by the following equation:

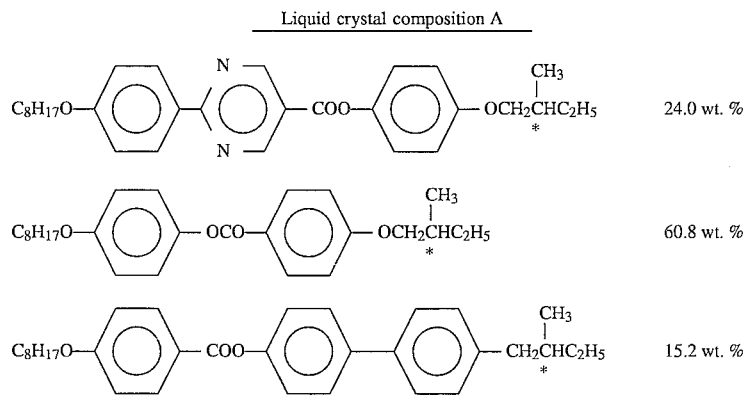

Liquid crystal composition A $$\rho = R_{LC} \cdot S/d$$

Comparative Example 1

A comparative liquid crystal cell was prepared in the same manner as in Example 1 except that the black vapor-deposited films were not formed. The transmittance at the non-pixel portions of the comparative cell was measured in the same manner as in Example 1, whereby an average transmittance of 5.3% was obtained.

Comparative Example 2

A comparative liquid crystal cell was prepared in the same manner as in Example 1 except that the polyimide protective films were not formed.

The comparative cell and the cell prepared in Example 1 were left standing for 96 hours under the environmental conditions of a temperature of 80° C. and a relative humidity of 60%, and the resistivities of the liquid crystal before and after the standing were measured, whereby the following results were obtained.

TABLE 1

|  | Resistivity before standing | Resistivity after standing |
| --- | --- | --- |
| Example 1 | 2.5 × 10$^{10}$ Ω · cm | 2.5 × 10$^{10}$ Ω · cm |
| Comparative Example 2 | 2.5 × 10$^{10}$ Ω · cm | 3.8 × 10$^8$ Ω · cm |

The resistivity values (ρ[Ω·cm]) described above were wherein d: thickness of liquid crystal layer (cell gap) and S: electrode area. In the above measurement, the following conditions were used: $f_1$=32 Hz, $f_2$=64 Hz, and V=10 volts.

EXAMPLE 2

A liquid crystal cell was prepared in the same manner as in Example I except that the blank vapor-deposition film was replaced by a 5000 Å-thick colored resin film of polyvinyl alcohol with a pigment mixture dispersed therein comprising copper phthalocyanine (1 wt. part), lead phthalocyanine (1 wt. part) and perylene red (1 wt. part) at a weight ratio of pigment/resin of 2/1, and the protective film was replaced from the polyimide film to the polyvinyl alcohol film.

The transmittance at the non-pixel portions of the liquid crystal cell was 1.6% on an average. The liquid crystal cell was left standing for 96 hours under the conditions of 80° C. and 60 %RH, similarly as above, whereby the liquid crystal cell after the standing retained a resistivity of 3.7×10$^{10}$ Ω·cm measured at the initial stage.

Comparative Example 3

A comparative liquid crystal cell was prepared in the same manner as in Example 2 and subjected to standing under the same conditions. As a result, the liquid crystal cell after the standing showed a resistivity of 4.7×10$^8$ Ω·cm which decreased remarkably from 3.7×10$^{10}$ Ω·cm at the initial stage.

As described above, according to the present invention, the light-interruption characteristics at the non-pixel portions can be remarkably improved without impairing the switching characteristics of the liquid crystal device. As a result, a display with a good image contrast can be provided for a long period of time.

What is claimed is:

1. A ferroelectric liquid crystal device, comprising:

a plurality of first stripe electrodes; a plurality of second stripe electrodes respectively arranged two-dimensionally, said second stripe electrodes being oppositely spaced from and intersecting with the first stripe electrodes so as to form a plurality of pixel portions at each intersection and a plurality of non-pixel portions where at most one of the first and second stripe electrodes is present so as not to provide a pair of opposing electrodes; and a ferroelectric liquid crystal disposed between the first and second stripe electrodes and extending over the pixel portions and the non-pixel portions, said ferroelectric liquid crystal being a chiral smectic liquid crystal disposed in a layer thin enough to release its helical structure in the absence of an electric field to form molecules in a first stable state and a second stable state, said non-pixel portions having a mixture of molecules in the first and second stable states;

each pair of opposing electrodes constituting a pixel portion being supplied with a pulse of one polarity to apply to the ferroelectric liquid crystal at the pixel portion a voltage waveform which decreases with time from commencement depending on a resistivity of the liquid crystal, and a reverse polarity voltage of a polarity opposite to said one polarity corresponding to the decrease of the voltage waveform;

said non-pixel portions further comprising a colored film for masking an optical state based on the mixture of molecules in the first and second stable states, and a protective film disposed on the colored film for preventing a substance causing a reduction in resistivity of the liquid crystal from eluting from the colored film into the liquid crystal.

2. A liquid crystal device according to claim 1, wherein said colored film comprises a resin film colored with a pigment or dye.

3. A liquid crystal device according to claim 1, wherein said colored film comprises a vapor-deposited film of a pigment or dye.

4. A liquid crystal device according to claim 1, wherein said colored film is black.

5. A liquid crystal device according to claim 1, wherein said protective film is also an insulating film.

6. A liquid crystal device according to claim 5, wherein said insulating film comprises an inorganic insulating material.

7. A liquid crystal device according to claim 5, wherein said insulating film comprises an organic polymer.

8. A liquid crystal device according to claim 1, wherein said protective film is also a uniaxial alignment control film.

9. A liquid crystal device according to claim 8, wherein the protective film has a capacitance of $5.5 \times 10^3$ pF/cm$^2$ or above.

10. A liquid crystal device according to claim 9, wherein the protective film has a capacitance up to $3.0 \times 10^5$ pF/cm$^2$.

11. A liquid crystal device according to claim 10, wherein the protective film has a capacitance of $9.0 \times 10^3$–$5.5 \times 10^4$ pF/cm$^2$.

12. A liquid crystal device according to claim 6, wherein said inorganic insulating material comprises at least one member selected from the group consisting of silicon nitride, silicon nitride containing hydrogen, silicon carbide, silicon carbide containing hydrogen, silicon oxide, boron nitride, boron nitride containing hydrogen, cerium oxide, aluminum oxide, zirconium oxide, titanium oxide, magnesium fluoride, SiO and SiO$_2$.

13. A liquid crystal device according to claim 7, wherein said organic polymer comprises at least one member selected from the group consisting of polyvinyl alcohol, polyimide, polyamideimide, polyesterimide, polyparaxylylene, polyester, polycarbonate polyvinyl acetal, polyvinyl chloride, polyvinyl acetate, polyamide, polystyrene, cellulose resin, melamine resin, urea resin, acrylic resin, and photoresist resin.

14. A liquid crystal device according to claim 1, wherein the colored film is disposed between a neighboring pair of the first and second stripe electrodes.

15. A chiral smectic liquid crystal device, comprising:

a plurality of first stripe electrodes; a plurality of second stripe electrodes respectively arranged two-dimensionally, said second stripe electrodes being oppositely spaced from and intersecting with the first stripe electrodes so as to form a plurality of pixel portions at each intersection and a plurality of non-pixel portions where at most one of the first and second stripe electrodes is present so as not to provide a pair of opposing electrodes; and a chiral smectic liquid crystal disposed between the first and second stripe electrodes and extending over the pixel portions and the non-pixel portions, said chiral smectic liquid crystal being disposed in a layer thin enough to release its helical structure in the absence of an electric field to form molecules in a first stable state and a second stable state, said non-pixel portions having a mixture of molecules in the first and second stable states;

each pair of opposing electrodes constituting a pixel portion being supplied with a pulse of one polarity to apply to the chiral smectic liquid crystal at the pixel portion a voltage waveform which decreases with time from commencement depending on a resistivity of the liquid crystal, and a reverse polarity voltage of a polarity opposite to said one polarity corresponding to the decrease of the voltage waveform;

said non-pixel portions further comprising a colored film for masking an optical state based on the mixture of molecules in the first and second stable states, and a protective film disposed on the colored film for preventing a substance causing a reduction in resistivity of the liquid crystal from eluting from the colored film into the liquid crystal.

* * * * *

UNITED STATES PATENT AND TRADEMARK OFFICE
CERTIFICATE OF CORRECTION

PATENT NO. : 5,461,494

DATED : October 24, 1995

INVENTOR : NOBUYUKI SEKIMURA, ET AL.

It is certified that errors appear in the above-identified patent and that said Letters Patent is hereby corrected as shown below:

On title page, item

[30] Foreign Application Priority Data

"Apr. 17, 1986 [JP] Japan ... 2-088605"

should read --Apr. 17, 1986 [JP] Japan ... 61-88605--.

AT [56] References Cited

U.S. PATENT DOCUMENTS

"4,638,089 1/1987 Okada et al."

should read --4,639,089 1/1987 Okada et al.--;

"4,846,540 7/1989 Tsuboyama et al."

should read --4,846,560 7/1989 Tsuboyama et al.--.

OTHER PUBLICATIONS

"Electrons" should read --Electronic--.

COLUMN 1

Line 18, "Least" should read --least--;

Line 19, "has" should read --have--;

Line 47, "in" should be deleted.

UNITED STATES PATENT AND TRADEMARK OFFICE
CERTIFICATE OF CORRECTION

PATENT NO. : 5,461,494

DATED : October 24, 1995

INVENTOR : NOBUYUKI SEKIMURA, ET AL.

It is certified that errors appear in the above-identified patent and that said Letters Patent is hereby corrected as shown below:

COLUMN 4

Line 37, "acrid" should read --acid--.

COLUMN 5

Line 45, "and" should read --or--;

Line 59, "(SINK*)," should read --(SmK*),-- and
        "(StaG*)" should read --(SmG*)--.

COLUMN 8

Line 1, "dural" should read --dual--.

COLUMN 10

Line 19, "polycarbonate" should read --polycarbonate,--.

Signed and Sealed this

Twenty-sixth Day of March, 1996

Attest:

BRUCE LEHMAN

Attesting Officer      Commissioner of Patents and Trademarks